United States Patent
Akita et al.

(10) Patent No.: US 6,849,155 B2
(45) Date of Patent: Feb. 1, 2005

(54) CONCENTRATOR

(75) Inventors: Kazuyuki Akita, Arai (JP); Toshiharu Minoda, Arai (JP)

(73) Assignee: Daicel Chemical Industries, Ltd., Osaka (JP)

( * ) Notice: Subject to any disclaimer, the term of this patent is extended or adjusted under 35 U.S.C. 154(b) by 81 days.

(21) Appl. No.: 10/291,387

(22) Filed: Nov. 12, 2002

(65) Prior Publication Data

US 2003/0094245 A1 May 22, 2003

(30) Foreign Application Priority Data

Nov. 14, 2001 (JP) ....................................... 2001-348441

(51) Int. Cl.$^7$ ................................................. B01D 3/42
(52) U.S. Cl. ........................... 159/44; 159/45; 159/901; 203/1; 203/3; 203/DIG. 9
(58) Field of Search ........................... 159/44, 901, 45; 203/1, 3, 100, DIG. 25, DIG. 18, DIG. 9, DIG. 11, DIG. 7, 48

(56) References Cited

U.S. PATENT DOCUMENTS

| | | |
|---|---|---|
| 2,732,008 A | 1/1956 | Seeley |
| 2,798,543 A | 7/1957 | Cook |
| 3,826,719 A | 7/1974 | Boyd et al. |
| 3,839,159 A * | 10/1974 | Dannauant et al. ......... 202/177 |
| 4,016,001 A | 4/1977 | Hoks |
| 4,046,638 A | 9/1977 | Fickel |
| 4,111,218 A * | 9/1978 | Hobbs ........................... 137/2 |
| 4,230,533 A * | 10/1980 | Giroux ........................... 203/3 |
| 5,162,081 A * | 11/1992 | Bowes .......................... 203/91 |
| 6,413,378 B1 * | 7/2002 | Kanauchi et al. ........... 202/160 |
| 6,508,915 B1 * | 1/2003 | Osuda et al. .................. 159/44 |

FOREIGN PATENT DOCUMENTS

| | | |
|---|---|---|
| FR | 1419663 | * 10/1965 |
| FR | 2564330 | * 11/1985 |

* cited by examiner

*Primary Examiner*—Virginia Manoharan
(74) *Attorney, Agent, or Firm*—Birch, Stewart, Kolasch, & Birch, LLP

(57) ABSTRACT

This invention provides a concentrator capable of drawing out a concentrate of a constant concentration. The concentrator includes a heater having a heating medium that has been heated to a temperature not less than the boiling point of a solution fed to the concentrator—whereby said heater heats the solution to evaporate the solvent to a vapor to make a mixture of the vapor and a liquid—and a gas-liquid separator for dividing the mixture into the liquid and the vapor. The concentrator provides for returning the liquid separated in the gas-liquid separator to the heater, for drawing out a portion of the liquid separated in the gas-liquid separator, for detecting the concentration of an intended component in the drawn out liquid, and for controlling the liquid draw-out so that when the concentration is above a predetermined threshold, liquid draw-out commences, and when the concentration is below the threshold, liquid draw-out stops.

16 Claims, 2 Drawing Sheets

CONCENTRATOR

TECHNICAL FIELD

This invention relates to a concentrator, more particularly to a concentrator that is capable of concentrating a liquid to a desirable concentration.

BACKGROUND ART

A forced-circulation falling film evaporator (often abbreviated to FFE), a continuous concentrator that has generally been used in various chemical processes, comprises a shell-and-tube exchanger, a gas-liquid separator, a returning line, a circulation pump, a draw-out line, a condenser, and a taking-out line. The shell-and-tube exchanger, which is a heater, heats a liquid with a heating medium that has been heated to a temperature above the boiling point of the liquid under the operation pressure. The heating changes the liquid to a mixture of vapor and liquid. The gas-liquid separator divides the mixture into a gas phase comprising the vapor and a liquid phase. The separated liquid together with the feedstock is returned to the shell-and-tube exchanger through the returning line. The circulation pump is placed in this returning line through which the pump forcibly circulates the liquid. Part of the liquid separated with the gas-liquid separator is drawn out as a concentrated liquid through the draw-out line. The divided vapor is condensed in a condenser to a condensate, which is then taken out from the system through the taking-out line.

This continuous concentrator is operated so that the level of liquid in the gas-liquid separator is kept constant by controlling the amount of evaporating vapor through the adjustment of heating in the heater, while the ratio of the flow rate of the feedstock fed into the continuous concentrator to the flow rate of the concentrate withdrawn through the draw-out line is being kept constant. Alternatively, the concentrator is operated so that the level of liquid in the gas-liquid separator is kept constant by controlling the flow rate of the concentrate drawn from the gas-liquid separator through the returning line, while the ratio of the flow rate of the feedstock fed into the continuous concentrator to the amount of vapor produced in the heater through the control of heating is kept constant through adjustment of the heating.

In these days has been accelerated the application of separating technique with a large-scale chromatographic system to the production of important drugs or medicinal intermediates. As a method of effectively resolving a mixture of optical isomers, a simulated moving bed separation method, which is a continuous chromatographic method capable of continuous mass production, is prevailing. Optical resolution of a mixture of optical isomers utilizing this simulated moving bed separation method typically comprises optically resolving a feedstock by the method to obtain a dilute solution including the intended component; concentrating the dilute solution with a film heater to make a concentrate; and taking out the intended component in the form of powder or crystal by crystallization while recycling the solvent recovered by vaporization and condensation with a condenser. Because such mixtures of optical isomers are often vulnerable to heat, film heaters such as falling film evaporators (FFE) and wiped film evaporators (WFE) are commonly employed for the heater. The film heater has good heat transfer efficiency and small pressure loss, and therefore is suitable for operation under a reduced pressure. It is also capable of keeping low the temperature of the heating source.

Because drugs and medicinal intermediated are extremely expensive, strict shop floor control based on GMT is required in the manufacture of drugs and medicinal intermediates utilizing simulated moving bed separation methods.

This strict shop floor control is also applied to the crystallization step. Specifically, when the concentration of a solution fed to the crystallization step is too small, it may result in a poor crystallization of the intended component. Note that a solvent used for chromatography is usually a good solvent to the intended component; in other words, such a solvent has properties of hindering the crystallization. On the other hand, when the concentration of the solution is too large, crystallization may take place while the solution is being transferred to the crystallization step, or the solution may not be sent smoothly due to a high viscosity of the solution.

In a combined system of a forced-circulation falling film evaporator with a simulated moving bed separation apparatus, when the producing process starts, the initial concentration of the concentrate obtained through the process in the evaporator is small. Therefore, when a method for producing an expensive substance for drugs and important medicinal intermediates using the system is carried out, if the amount of the concentrate to be drawn out to the amount of the feedstock being fed to the concentrator is simply set, the concentration of the intended component in the concentrate withdrawn through the draw-out line is small until the continuous concentrator is operated in a stationary state. As a result, crystallization cannot be carried out effectively.

Besides, when operating conditions of the simulated moving bed separation apparatus are changed, adjusting the operating condition of the continuous concentrator cannot follow the changes quickly.

PROBLEMS TO BE SOLVED BY THE INVENTION

An object of this invention is to solve the aforementioned problems. Specifically, an objective of the invention is to provide a concentrator capable of concentrating an extract or raffinate from a simulated moving bed chromatographic apparatus to a concentrate of a predetermined concentration, constantly and automatically.

Another objective of this invention is to provide a concentrator that is capable of producing a concentrate of a constant predetermined concentration so that a concentrate of the extract or raffinate can be crystallized effectively. Still another objective of the invention is to provide a concentrator that is capable of automatically sending the concentrate to a crystallizer, when the concentrate having an intended component in a constant predetermined concentration reaches a set amount.

A still further objective of the invention is to provide a concentrator that is capable of producing a concentrate of a high concentration just after the operation of the simulated moving bed chromatographic apparatus started, and of maintaining a proper concentration of the concentrate even when the operational conditions of the apparatus are changed.

MEANS FOR SOLVING THE PROBLEMS

In order to solve the aforementioned problems, the invention provides the following apparatuses:
(1) A concentrator which comprises:
a heater having a heating medium that has been heated to a temperature not less than the boiling point of a solution fed to the concentrator, whereby said heater heats the solution to evaporate the solvent to a vapor to make a mixture of the vapor and a liquid;

a gas-liquid separator for dividing the mixture into the liquid and the vapor;

returning means for returning the liquid separated in the gas-liquid separator to the heater;

liquid draw-out means for drawing out a portion of the liquid separated in the gas-liquid separator;

concentration detecting means for detecting the concentration of a substance in the drawn out liquid;

control means for controlling the liquid draw-out means so that when the concentration is above a predetermined threshold, the liquid draw-out means starts the drawing out, and when the concentration is below the threshold, the liquid draw-out means stops the drawing out.

(2) The concentrator recited in (1) above, wherein the concentration detecting means comprises physical property detecting means for detecting at least one physical property associated with the concentration of an intended component, and calculating means for calculating the concentration from the detected physical property.

(3) The concentrator recited in (2) above, wherein the physical property detecting means is a detector selected from the group consisting of a mass flowmeter, a gamma radiographic densimeter, and a viscometer measuring the viscosity of the drawn out liquid.

(4) The concentrator recited in (1) above, wherein the returning means comprises a pipe through which the liquid obtained in the gas-liquid separator is returned to the heater, a pump placed in the pipe, and a bypass connected with the pipe at a point downstream of the pump, wherein a part of the liquid flowing in the pipe is drawn through the bypass and the drawn part of the liquid is returned to the pipe; the concentration detecting means comprises a mass flowmeter and a flow-regulating valve placed in the bypass; and the liquid draw-out means comprises a cross valve placed in the downstream of the mass flowmeter and the flow-regulating valve in the bypass, and a flow path connected to the cross valve.

(5) The concentrator recited in anyone of (1)–(4) above, wherein the liquid draw-out means is transporting means for transporting the liquid from the gas-liquid separator to a crystallizer.

(6) The concentrator recited in anyone of (1)–(5) above, wherein the liquid draw-out means is connected with plural storage means through the transporting means; the transporting means includes flow path-changing means for changing flow paths through which the liquid flows so as to send the liquid to one of the storage means; and the controlling means is capable of controlling the flow path-changing means so that when the amount of the targeted substance in the selected storage reaches a predetermined amount, sending the liquid to the selected one of the storage means is stopped and sending the liquid to another storage is started.

(7) The concentrator recited in (6) above, wherein the amount of the targeted substance is represented by a value of time quadrature that is calculated by the controlling means through multiplication of the flow rate of the liquid by the concentration of the targeted substance in the liquid.

(8) The concentrator recited in (6) above, the amount of the targeted substance is represented by a value that is calculated by the controlling means through multiplication of the volume of the liquid stored in the storage means by the average concentration of the targeted substance in the liquid.

EXPLANATION OF REFERENCE NUMERALS

1 ... concentrator; 1a ... concentrator; 2 ... heater; 3 ... gas-liquid separator; 4 ... returning device; 4a ... pipe; 5 ... liquid draw-out device; 6 ... concentration detector; 7 ... controller; 8a, 8b ... feedstock line; 9 ... transferring line; 10 ... vapor discharging line; 11 ... pump; 12 ... bypass; 13 ... cross valve; 14 ... branched pipe; 15 ... transporting device; 15a ... transporting pipe; 16 ... storage means; 16a, 16b ... storage tank; 17 ... flow path-changer; 17a ... cross valve

DETAILED DESCRIPTION OF THE PREFERRED EMBODIMENTS

Figure 1:
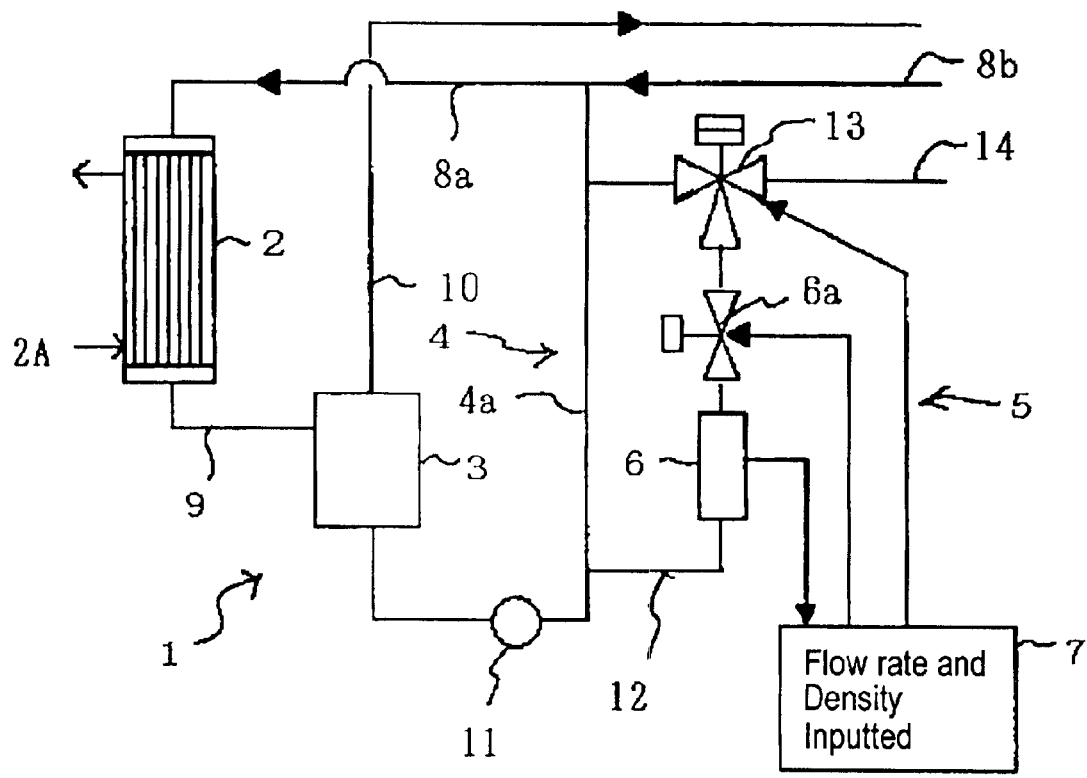
FIG. 1 is a schematic illustration of a concentrator that is an example in accordance with this invention.

FIG. 1 is a schematic illustration of a concentrator that is an embodiment of this invention. As shown in FIG. 1, the concentrator (1) of this invention comprises a heater (2), a gas-liquid separator (3), a returning device (4), a liquid draw-out device (5), a concentration detector (6) and a controller (7).

Heater 2 is designed so as to heat a mixture of an extract or raffinate that is fed from a simulated moving bed chromatographic apparatus (not shown) and which may be called a feedstock hereinafter, with a liquid that is a concentrated liquid forcibly returned with returning device 4, to evaporate a portion of the mixture. Heating is carried out with heating means 2A that is capable of heating the mixture to above its boiling point under the operation pressure. When heater 2 is a forced-circulation falling film evaporator, a shell-and-tube exchanger of long-tube vertical type is employed for heating means 2A.

For this function, the top part of heater 2 is connected with feedstock lines 8a and 8b, through which the mixture of the extract or raffinate with a circulated liquid is fed, while the bottom part of heater 2 is connected with transferring line 9, through which a concentrated liquid, which may be called "concentrate" or "liquid phase" herein, and vapor are transferred to gas-liquid separator 3. As mentioned above, heater 2 has heating means 2A for heating an extract or raffinate to vaporize it to a predetermined extent.

Just before starting the operation of the total system, a predetermined amount of a liquid premixture of the solvent that is used in the simulated moving bed chromatographic apparatus with a raffinate or extract is placed in gas-liquid separator 3. Then, the operation is started. When the pressure in the system reaches a predetermined value, the circulation of the liquid premixture is started. Simultaneously with the commencement of feeding the feedstock, heating with heater 2 is begun. When the mixture of the feedstock with the liquid premixture reaches its boiling point under the pressure in the system, part of the feedstock and the circulated premixture is evaporated, so that the mixture is concentrated. Thus is formed a mixed flow having a gas phase of the evaporated gas and a liquid phase of the concentrated liquid.

The degree of concentration in heater 2 is decided through the consideration of the whole system including concentrator 1. Specifically, for example, when concentrator 1 is incorporated in a simulated moving bed chromatographic apparatus, the degree of concentration depends on the solubility and the amount of the targeted component dissolved in the extract or raffinate, the viscosity of the extract or raffinate, and the degree of influence of the solvent in the crystallization step. So, the degree of concentration cannot be decided unconditionally. However, as long as the solubility is such that the crystallization does not take place in the pipes and the viscosity is such that the liquid can be sent through the pipes, a larger degree of concentration is preferable because it can reduce the influence of the solvent in the crystallization step and, if the solvent is recovered, it can increase the recovery. Based on these discussions, generally, concentration should be carried out to such an extent that the amount of the targeted component is about 10–50% by weight. Note the amount of the targeted component in an extract that is fed from the simulated moving bed chromatographic apparatus is about 0.1–2% by weight, and the amount of the targeted component in a raffinate fed from the apparatus is about 0.3–4% by weight.

Gas-liquid separator 3 is designed so as to divide a mixture of the vapor and the solution, which has been concentrated to a predetermined concentration in heater 2, into gas and a solution. The reason why the evaporation in heater 2 makes a mixed flow of gas and liquid is that the feedstock and the circulated premixture are fed to heater 2 at a large flow rate through the top part of the heater. Gas-liquid separator 3, in turn, suddenly reduces the flow rate, which results in the separation of the gas phase from the liquid phase. Therefore a container having an inner space enough to reduce the flow rate should be employed for gas-liquid separator 3. In order to prevent spray from accompanying and to perfect the separation of the gas from the liquid, gas-liquid separator 3 is preferably provided with a mist separator. Alternatively, depending on circumstances, a container having an inner space enough to reduce the flow rate may be directly, without transferring line 9, connected with the bottom of heater 2. The container serves as gas-liquid separator 3.

Gas-liquid separator 3 is provided with a vapor-discharging line (10) for discharging vapor in the separator to the outside of the system. Vapor-discharging line 10 is connected with a condensing device (not shown in the figures), which is sometimes called "condenser". In the condensing device the vapor separated in gas-liquid separator 3 is condensed to liquid.

Also, gas-liquid separator 3 is provided with a pipe (4a) that is returning device 4 for returning the concentrated solution to heater 2.

In an example shown in FIG. 1, one end of pipe 4a is connected to the bottom of gas-liquid separator 3 and the other end to the top of heater 2. A pump (11) for sending the liquid is placed in pipe 4a. A centrifugal pump that is common in this field is often employed for pump 11. When a centrifugal pump is used, the amount of the liquid withdrawn through bypass 12 is controlled by adjusted a flow-regulating valve that is placed in bypass 12. This adjustment is carried out by controller 7 based on the indication of a mass flowmeter placed in bypass 12. Another method of adjusting the amount of the drawn liquid may be to provide bypass 12 with a metering pump such as a plunger pump or diaphragm pump and a flowmeter. Based on the indication of the flowmeter controller 7 adjusts the rotational frequency of the motor of the metering pump with a frequency changer.

A part of pipe 4a is shared with feedstock line 8a. In other words, feedstock line 8b is connected with pipe 4a at a point downstream from pump 11, whereby a feedstock such as an extract or raffinate as well as the concentrated liquid separated in gas-liquid separator 3 is fed to heater 2. To sufficiently mix the returned concentrate with the feedstock, a static mixer (not shown in the figures) is placed in feedstock line 8a near the joint of feedstock lines 8a and 8b.

As mentioned above, returning device 4 utilizes a part of feed stock line 8a in this example. Also possible is to provide pipe 4a, which is an element of returning device 4, and feedstock line 8a completely separately, although it is not desirable in view of the achievement of a uniform evaporation.

In bypass 12, which is an example of the liquid draw-out device, connected with pipe 4a at a point downstream of pump 11 is placed a concentration detector (6).

Concentration detector 6 is designed so as to detect the concentration of a concentrate. Concentration detector 6 comprises, for example, a device of detecting at least one physical property of the targeted component in the concentrate, and a calculator for calculating the concentration of the targeted component from the detected physical property. The physical property-detecting device includes a mass flowmeter that detects a flow rate and a density utilizing a Coriolis force that is produced when a fluid passes through a capillary, a gamma ray density meter utilizing a difference in the transmitted amount of a gamma ray caused by the density of the detected fluid, a viscometer measuring the viscosity of the concentrate, etc. For concentration detector 6 is preferred a detector that can measure the flow rate and density of the concentrate. Examples are the mass flowmeter and the combination of a flowmeter with a densimeter.

In the example shown in FIG. 1, bypass 12 is connected with branched pipe 14, which is an element of liquid draw-out device 5, at a point downstream of concentration detector 6 via cross valve 13. In the part of bypass 12 between concentration detector 6 and cross valve 13 is placed a flow-regulating valve (6a). Flow-regulating valve 6a is controlled by controller 7.

Liquid draw-out device 5 is a device for drawing a solution flowing through bypass 12 to the outside of the system, and comprises branched pipe 14, as mentioned above.

Cross valve 13 is controlled by controller 7 and is capable of selecting and changing the flow paths.

Controller 7 controls the liquid draw-out device so that the device starts drawing-out when the concentration detected with the concentration detector is larger than a predetermined threshold, and the device stops the drawing-out when the concentration is smaller than the predetermined threshold. For example, when controller 7 receives a concentration-detecting signal showing the concentration of a concentrate outputted from concentration detector 6, controller 7 judges whether the detected concentration is smaller than a predetermined threshold. If smaller, controller 7 controls cross valve 13 to prevent the liquid from flowing out from bypass 12 to liquid draw-out device 5. On the other hand, if the detected concentration is larger than the predetermined threshold, controller 7 operates cross valve 13 to let the liquid flow out of bypass 12 to liquid draw-out device 5.

If liquid draw-out device 5 includes a metering pump that is capable of changing the sucking and discharging amount, controller 7 may output and send a controlling signal to the metering pump to adjust the flow rate to a predetermined value. If liquid draw-out device 5 includes a flow-regulating valve capable of changing the flow rate and a flowmeter, controller 7 may operate the flow-regulating valve to adjust the flow rate based on the flow rate of the solution detected with the flowmeter.

The concentrator having the above-mentioned structure functions as follows.

An extract or raffinate withdrawn from the simulated moving bed chromatographic apparatus is sent to heater 2 through feedstock lines 8a and 8b. Whether the feedstock is an extract or a raffinate, the concentrator functions in the same way. Therefore, in the followings, explanation will be made for an extract.

As mentioned above, a part of feedstock line 8a is shared with returning device 4. Since pump 11 is placed in pipe 4a, which returning device 4 comprises, it prevents an extract that flows through feedstock line 8b into feedstock line 8a from back-flow to pump 11 in pipe 4a.

In heater 2, the extract is heated with a heating medium that has been heated to a temperature above the boiling point of the extract under the operation pressure, and concentrated. Concentration in heater 2 forms a mixed flow of gas and liquid in which the concentrate and the vapor are mixed. The mixed flow is sent to gas-liquid separator 3 through transferring line 9.

Upon the introduction of the mixed flow, gas-liquid separator 3 drastically reduces the flow rate to divide the mixed flow into a gas phase and a liquid phase.

From vapor discharging line 10 connected with gas-liquid separator 3 is discharged the vapor, which is from the gas phase. The discharged vapor is sent to a condenser (not shown) and then condensed to a condensate. The condensate may be reused or disposed of.

The solution concentrated in gas-liquid separator 3, a concentrate, is returned to heater 2 through returning device 4. In an example shown in FIG. 1, the concentrate obtained in gas-liquid separator 3 is sent through pipe 4a, forcibly transported with pump 11, and returned to heater 2 via feedstock line 8a. During this returning, the concentrate flowing through pipe 4a is also branched to bypass 12. The concentrate flowing through bypass 12 is subjected to measurement of the concentration with concentration detector 6. Then, the concentrate is returned to pipe 4 or drawn out through branch pipe 14, the route being decided by the path selection of cross valve 13.

Now, we will explain more in detail the function of the apparatus when a fresh extract is introduced from the simulated moving bed chromatographic apparatus to this concentrator.

A fresh extract is introduced to heater 2 through feedstock lines 8a and 8b. Just after the starting of the operation, the concentration of the extract is small, about 0.1–2% by weight or less, which is the concentration of the withdrawn extract itself.

After the operation is just started, the dilute extract is not concentrated to a predetermined concentration in heater 2. Specifically, the dilute extract is converted to a mixed flow of a slightly concentrated extract and evaporated vapor, which is sent to gas-liquid separator 3 through transferring line 9. In gas-liquid separator 3, the slightly concentrated extract is added to a solution that has been stored in the separator, which causes volatile components in the solution to evaporate. Since a mixed flow of the solution and the vapor is continuously sent from heater 2 to gas-liquid separator 3, and the solution storage volume of the separator is limited to a fixed amount, an amount of the solution is drawn from gas-liquid separator 3 and sent to returning device 4. Immediately after the start of feeding an extract, the degree of concentration in gas-liquid separator 3 is not sufficiently large.

The concentrate drawn from gas-liquid separator 3 through returning device 4 is returned to heater 2 through feedstock line 8a.

The transported concentrate also flows into bypass 12 where for example, the density thereof is measured with concentration detector 6 such as a densimeter. Concentration detector 6 outputs the measured density in the form of an electric signal, which is named a density signal, and the signal is sent to controller 7.

The concentrate having flown into bypass 12 is returned to pipe 4a of returning device 4 via cross valve 13 and then to heater 2 through feedstock line 8a.

Since the density of the concentrate measured with the densimeter is small immediately after the start of feeding an extract, controller 7, upon receiving the density signal, naturally judges that the concentration of the concentrate is smaller than a predetermined threshold. Then, controller 7 outputs a controlling signal that controls cross valve 13 so that the draw-out of the concentrate is not carried out.

In this mode, the vapor in gas-liquid separator 3 is discharged from the separator through vapor discharging line 10 to the outside of the system. Evaporation of the volatile components from the solution is accelerated, which leads to an increase in the concentration of the solution.

As the concentrate is re-fed from gas-liquid separator 3 through returning device 4, the extract is continuously fed from the simulated moving bed chromatographic apparatus through feedstock lines 8a and 8b.

In heater 2, to which the concentrate and extract are fed, concentration is carried out. Now, since heater 2 contains the concentrate in addition to the extract fed from the simulated moving bed chromatographic apparatus, vapor and a solution having a larger concentration than that in the initial stage are sent to gas-liquid separator 3. In other words, the concentration of the solution discharged from heater 2 becomes larger with time.

Also, when vapor and a solution that has an increased concentration are sent in to gas-liquid separator 3, since vapor-discharging line 10 is open, the concentration is further increased in gas-liquid separator 3.

Thus, by returning the concentrate thickened in gas-liquid separator 3 to heater 2 through returning device 4 simultaneously with feeding the extract drawn from the simulated moving bed chromatographic apparatus, the concentration of the solution in gas-liquid separator 3 increases rapidly as time passes from the initial feeding of the extract.

If controller 7, upon receiving a concentration signal outputted from concentration detector 6 that has measured the concentration of the concentrate discharged from gas-liquid separator 3, judges that the concentration is larger than a predetermined threshold, the controller outputs a controlling signal that switches cross valve 13 so that bypass 12 communicates with branched pipe 14 of liquid draw-out device 5.

Then, drawing-out of the liquid from gas-liquid separator 3 is started. Changes in the concentration in gas-liquid separator 3 subsequent to this start are determined depending on the amount of liquid drawn with device 5. When the amount is set properly at this point of time, the amount of the extract drawn equals that of the extract fed from the simulated moving bed chromatographic apparatus, which means that the concentration of the solution in gas-liquid separator 3 will be kept constant afterwards. However, when the amount of the drawn-out extract is less than the proper one and is also less than the amount of the extract fed from the simulated moving bed chromatographic apparatus, the concentration of the solution in gas-liquid separator 3 increases until the amount of the extract fed from the simulated moving bed chromatographic apparatus equals that of the extract component in the drawn-out liquid, although increase in the concentration slows down. On the other hand, when the amount of the drawn-out extract equals that of the fed extract and the concentration of the drawn-out extract is larger than a predetermined upper limit, controller 7 outputs an alarm signal to increase the drawn-out amount. When the amount of the drawn-out liquid is large and the amount of the drawn-out extract is larger than that of the extract fed from the simulated moving bed chromatographic apparatus, on the contrary, the concentration of the solution in gas-liquid separator 3 begins decreasing.

In this case, the concentration of the concentrate measured with concentration detector 6 tends to decrease, as time passes away, from when cross valve 13 is changed so as to connect bypass 12 with branched pipe 14. However, the operation can be carried out without serious problems in this case. The reasons will be explained in the followings.

As long as the concentration of the concentrate measured with concentration detector 6 is beyond a predetermined value, controller 7 continues outputting a controlling signal that orders cross valve 13 to keep branched pipe 14 communicating with bypass 12.

When the concentration of the concentrate detected with concentration detector 6 is below the predetermined value, controller 7 outputs a controlling signal to switch cross valve 13 so as to connect bypass 12 with pipe 4a. Then, the drawing-out of the concentrate with liquid draw-out device 5 is stopped, while vapor is discharged from gas-liquid separator 3 to thicken the liquid.

Thus, this concentrator has concentration detector 6 that watches the concentration of the concentrate discharged from gas-liquid separator 3 and returned to heater 2, which concentration detector 6 enables the concentrator to operate depending on measured concentrations; when the detected concentration is larger than a predetermined value, concentration operation with heater 2 and gas-liquid separator 3 is stopped and drawing-out of the concentrate is continued, while when the concentration is smaller than the value, concentration operation is restarted and drawing-out of the concentrate is stopped. Consequently, the concentration of the concentrate drawn out is kept nearly constant, although it has small changes around the predetermined value.

Hereinbefore an example of this invention was explained. Needless to say, this invention is not limited to the example and can be changed and modified within the gist thereof.

Concentration detector 6 is not necessarily placed in the bypass; it may be placed anywhere as long as it can detect the density of the concentrate thickened in gas-liquid separator 3. For example, bypass 12 may be omitted and a concentration detector may be placed in returning device 4. In this variety, for example, when a centrifugal pump is employed for the circulation pump, a flowmeter, a flow-regulating valve and a shut-off valve are placed in the branched pipe of the liquid draw-out device. As another example, when the circulation pump is a metering pump, a flowmeter, an ordinary valve and a shut-off valve are placed in the branched pipe.

Figure 2:
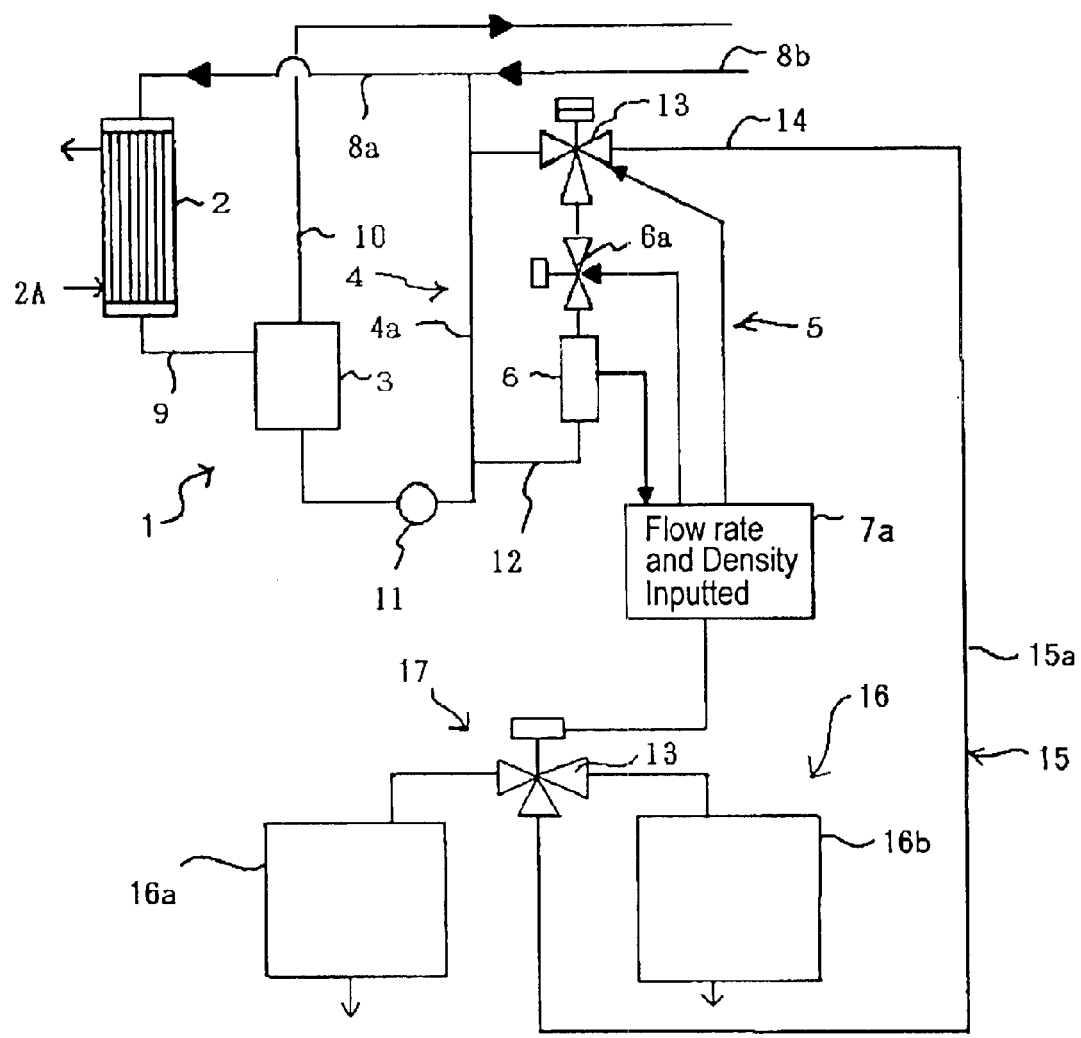
FIG. 2 is a schematic illustration of a concentrator that is another example in accordance with this invention.

Referring to FIG. 2, we will explain another embodiment of the invention.

FIG. 2 is a schematic illustration showing a concentrator that includes, in addition to the functions the concentrator of FIG. 1 has, a function automatically sending a concentrate of a predetermined concentration to a crystallization tank, which is sometimes called a crystallizer.

As shown in FIG. 2, a concentrator of this embodiment (1a) includes plural storage means (16) that are connected with liquid draw-out device 5 via transporting device 15, a flow-path changer (17) with which transporting device 15 is provided, and a controller (7a) that controls flow-path changer 17.

More specifically, transporting pipe 15a, which is an example of transporting device 15, is connected with branched pipe 14 that is a part of liquid draw-out device 5. In FIG. 2, for two storage means 16 are set storage tanks 16a and 16b, with which transporting pipe 15a is connected via cross valve 17a, which is an example of flow-path changer 17.

Storage tanks 16a and 16b may be tanks capable of storing a predetermined amount of liquid. Each of storage tanks 16a and 16b is provided with a liquid level indicator (not shown). When the liquid level indicator judges that the liquid level in storage tank 16a or 16b is higher than a predetermined level, the indicator outputs an electric signal and sends it to controller 7a. Controller 7a, upon receiving the electric signal from the indicator, outputs a controlling signal to switch cross valve 17a so that transportation of the liquid to the tank 16a or 16b that has the alarming indicator is stopped.

Also, a transfer pipe through which the concentrate is transported to the crystallizer (not shown) is connected with each of two storage tanks 16a and 16b. Each of tanks 16a and 16b is provided with an on-off valve of which operation is controlled by controller 7a.

As mentioned above, controller 7a also controls the switching operations of cross valve 17a.

Controller 7a further carries out the following calculation in addition to controlling cross valve 17a and the controlling operations controller 7 in FIG. 1 does.

Specifically, upon receiving the concentration data of the concentrate outputted by concentration detector 6 and the flowmeter (not shown) placed in bypass 12, and the flow rate data of the concentrate flowing through the bypass, controller 7a calculates weight X of the targeted component included in, for example, the extract contained in storage tanks 16a and 16b at the time of calculation by integrating by time the multiplication of the concentration by the flow rate. The flow rate is shown by weight per time, and the concentration is the amount of the targeted component in a liquid, which is a concentrate, i.e. an extract or raffinate.

For which of the extract stored in storage tank 16a and that in tank 16b weight X of the targeted component is calculated is decided depending on the switching condition of cross valve 17a; which storage tank cross valve 17a connects transporting pipe 15a with.

Controller 7a memorizes threshold Y, which is the weight of the targeted component to be included in an extract or raffinate stored in storage tanks 16a and 16b.

When controller 7a judges that weight X equals threshold Y, it outputs a controlling signal to change over cross valve 17a so as to stop transporting the concentrate to storage tank 16a and start transporting it to storage tank 16b.

Associated with this change-over operation, controller 7a opens the on-off valve, which is not shown in the figure, fitted on storage tank 16a to let the concentrate pass through the valve to the crystallizer.

The change-over of cross valve 17a begins transporting the concentrate to storage tank 16b. Needless to say, the on-off valve fitted on this tank is kept closed by controller 7a.

Controller 7a controls liquid draw-out device 5 in the same way as controller 7 in FIG. 1 does; when the concentration of the targeted component in the concentrate measured with concentration detector 6 is beyond a predetermined threshold, the drawing-out of the concentrate is started, while the concentration is below the threshold, the drawing-out is stopped.

Consequently, after the change-over of cross valve 17a and until the weight of the targeted component in the extract to be stored in storage tank 16b reaches threshold Y, the transportation of the concentrate to storage tank 16b is stopped or restarted depending on the concentration of the targeted component in the concentrate, which is measured with concentration detector 6.

As explained hereinabove, the concentrator of this invention, an example of which is shown in FIG. 2, achieves the objective of making crystallization in the crystallization efficient.

In place of controller 7a that calculates weight X of the targeted component included in, for example, the extract contained in storage tanks 16a and 16b at the time of calculation by integrating by time the multiplication of the concentration by the flow rate, may be employed a controller that calculates weight X from the weight of the concentrate contained in the storage tank and an average concentration of the targeted component in the concentrate.

When the concentrator is provided with the latter controller, each of storage tanks 16a and 16b is provided with a liquid level indicator, and each indicator sends data representing the liquid level, which will be called "liquid level data", to controller 7a. On the other hand, concentration detector 6 sends data representing the concentration, which will be called "concentration data", to controller 7a. Upon receiving the liquid level data and the concentration data, controller 7a calculates an average concentration (Cbar) from the concentration data being sent continuously, and also calculates weight L of the concentrate in storage tank 16a or 16b from the volume thereof, which corresponds to the liquid level data, and the density obtained from the concentration. Finally, controller 7a calculates weight X of the targeted component included in the concentrate by multiplying average concentration Cbar by weight L.

Weight X of the targeted component thus calculated is compared with threshold Y in the same way as that mentioned above. When weight X equals threshold Y, controller 7a sends a controlling signal to cross valve 17a to switch the valve so that the transportation of the concentrate to storage tank 16a into which the concentrate has been poured is stopped and the transportation to storage tank 16b is started.

Whether the controller 7a employs the former calculation or the latter, when weight X of the targeted component included in, for example, the extract in either storage tank 16a or 16b reaches predetermined threshold Y, the concentrate in storage tank 16a or 16b is sent to the crystallizer to be subjected to crystallization.

A crystallizing operation is one to let a solute crystallize by removing a solvent that dissolves the solute. An effective crystallization means to make maximum the concentration of the concentrate transported to the crystallizer. In other words, the concentrate is kept from precipitation during the transportation, yet should begin precipitation before long when it is under the crystallizing operation.

Like concentrator 1a shown in FIG. 2, the employment of a concentrator having plural storage tanks (16a and 16b), in either of which the concentrate drawn with liquid draw-out device 5 is stored, makes it possible to send a concentrate of a predetermined amount to the crystallizer at once. It realizes an efficient crystallization.

In FIG. 2 is shown a concentrator that has two storage tanks. Needless to say, the number of storage tanks is not limited.

ADVANTAGES OF THE INVENTION

In the operation of a concentrator in accordance with this invention, priority is given to concentration and the drawing-out of the concentrate is not carried out for a predetermined period from the point of time when the simulated moving bed chromatographic apparatus starts feeding an extract or raffinate to the concentrator. After the period, a concentrate of a predetermined concentration is discharged. Consequently, this concentrator combined with a crystallizer can remove such disadvantages as a concentrate including a small concentration of the component to be precipitated in the crystallizer is sent to the crystallizer and precipitation does not take place, or as a concentrate of too high concentration is discharged and precipitation takes place in the pipe between the concentrator and another apparatus, for example a crystallizer.

The concentrator of this invention can provide a concentrate of a constant concentration when the concentration of an extract or raffinate fed from the simulated moving bed chromatographic apparatus varies resulting from changes in the operating condition of the apparatus.

Furthermore, the concentrator of this invention is capable of transporting to a crystallizer a predetermined amount of a crystallizable concentrate that has an optimal concentration for crystallization. Therefore, the concentrator makes possible an automatic continuous control of concentration and crystallization, which leads to the realization of an efficient crystallizing operation.

We claim:

1. A concentrator which comprises:

a heater having a heating medium that has been heated to a temperature not less than the boiling point of a solution fed to the concentrator, whereby said heater heats the solution to evaporate the solvent to a gas to make a mixture of the gas and a liquid;

a gas-liquid separator for dividing the mixture into the liquid and the gas;

returning means for returning the liquid separated in the gas-liquid separator to the heater;

concentration detecting means for detecting the concentration of an intending component in the separated liquid, said concentration detecting means communicating with said returning means;

a flow-regulating valve connected to said concentration detecting means and placed downstream thereof;

liquid draw-out means for drawing out a portion of the liquid separated in the gas-liquid separator, said liquid draw-out means comprising a flow path through which said portion of the liquid is drawn and a cross valve having an inlet, a first outlet, and a second outlet and placed downstream of said flow-regulating valve, wherein said inlet is connected to said flow-regulating valve, said first outlet communicates with said returning means, and said second outlet is connected to said flow path; and control means for controlling said flow-regulating valve and said cross valve so that: when the concentration detected with said concentration detecting means is above a predetermined threshold, said inlet of said cross valve communicates with said second outlet thereof; when the concentration is below the threshold, said inlet of said cross valve communicates with said first outlet thereof; and the amount of the drawn out liquid is controlled through the operation of said flow-regulating valve depending on the concentration.

2. The concentrator as claimed in claim 1, wherein the concentration detecting means comprises physical property detecting means for detecting at least one physical property associated with the concentration of the intended component, and calculating means for calculating the concentration from the detected physical property.

3. The concentrator as claimed in claim 2, wherein the physical property detecting means is a detector selected from the group consisting of a mass flowmeter, a gamma radiographic densimeter, and a viscometer measuring the viscosity of the drawn-out liquid.

4. The concentrator as claimed in claim 2, wherein the liquid draw-out means further comprises transporting means for transporting the liquid from the gas-liquid separator to subject the liquid to crystallization.

5. The concentrator as claimed in claim 4, wherein:
the liquid draw-out means is connected with plural storage means through transporting means;
the transporting means includes flow path-changing means for changing flow paths through which the liquid flows so as to send the liquid to one of the storage means; and
the controlling means is capable of controlling the flow path-changing means so that when the amount of the intended component in a selecting one of the storage means reaches a predetermined amount, sending the liquid to the selecting storage is stopped and sending the liquid to another storage is started.

6. The concentrator as claimed in claim 5, wherein the amount of the intended component is represented by a valve of time quadrature that is calculated by the controlling means through multiplication of the flow rate of the liquid by the concentration of the intended component in the liquid.

7. The concentrator as claimed in claim 5, wherein the amount of the intended component is represented by a valve that is calculated by the controlling means through multiplication of the volume of the liquid stored in the storage means by an average concentration of the intended component in the liquid.

8. The concentrator as claimed in claim 1, wherein
said returning means comprises a pipe through which the liquid obtained in said gas-liquid separator is returned to said heater, a pump placed in said pipe, and a bypass connected with said pipe at a point downstream of said pump, wherein a part of the liquid flowing in said pipe is drawn through said bypass and the drawn part of the liquid is returned to said pipe;
said concentrator detecting means comprises a mass flowmeter; and
said concentrator detecting means, said flow-regulating valve, and said cross valve are placed in said bypass in the specified order in the direction of liquid flow.

9. The concentrator as claimed in claim 8, wherein the liquid draw-out means further comprises transporting means for transporting the liquid from the gas-liquid separator to subject the liquid to crystallization.

10. The concentrator as claimed in claim 9, wherein:
the liquid draw-out means is connected with plural storage means through transporting means;
the transporting means including flow path-changing means for changing flow paths through which the liquid flows so as to send the liquid to one of the storage means; and
the controlling means is capable of controlling the flow path-changing means so that when the amount of the intended component in a selected one of the storage means reaches a predetermined amount, sending the liquid to the selected storage is stopped and sending the liquid to another storage is started.

11. The concentrator as claimed in claim 10, wherein the amount of the intended component is represented by a valve of time quadrature that is calculated by the controlling means through multiplication of the flow rate of the liquid by the concentration of the intended component in the liquid.

12. The concentrator as claimed in claim 10, wherein the amount of the intended component is represented by a valve that is calculated by the controlling means through multiplication of the volume of the liquid stored in the storage means by an average concentration of the intended component in the liquid.

13. The concentrator as claimed in claim 1, wherein the liquid draw-out means further comprises transporting means for transporting the liquid from the gas-liquid separator to subject the liquid to crystallization.

14. The concentrator as claimed in claim 13, wherein:
the liquid draw-out means is connected with plural storage means through transporting means;
the transporting means includes flow path-changing means for changing flow paths through which the liquid flows so as to send the liquid to one of the storage means; and
the controlling means is capable of controlling the flow path-changing means so that when the amount of the intended component in a selected one of the storage means reaches a predetermined amount, sending the liquid to the selected storage in stopped and sending the liquid to another storage is started.

15. The concentrator as claimed in claim 14, wherein the amount of the intended component is represented by a valve of time quadrature that is calculated by the controlling means through multiplication of the flow rate of the liquid by the concentration of the intended component in the liquid.

16. The concentrator as claimed in claim 14, wherein the amount of the intended component is represented by a valve that is calculated by the controlling means through multiplication of the volume of the liquid stored in the storage means by an average concentration of the intended component in the liquid.

* * * * *